Aug. 27, 1935.  F. A. PARSONS  2,012,690
TRANSMISSION AND CONTROL MECHANISM
Filed Feb. 28, 1929  4 Sheets-Sheet 1

INVENTOR
Fred A Parsons

Aug. 27, 1935.  F. A. PARSONS  2,012,690
TRANSMISSION AND CONTROL MECHANISM
Filed Feb. 28, 1929  4 Sheets-Sheet 2

INVENTOR
Fred A. Parsons

Aug. 27, 1935.  F. A. PARSONS  2,012,690

TRANSMISSION AND CONTROL MECHANISM

Filed Feb. 28, 1929  4 Sheets-Sheet 3

INVENTOR
Fred A Parsons

Fig. 8.

Patented Aug. 27, 1935

2,012,690

UNITED STATES PATENT OFFICE 2,012,690

TRANSMISSION AND CONTROL MECHANISM

Fred A. Parsons, Milwaukee, Wis., assignor to Kearney & Trecker Corporation, West Allis, Wis.

Application February 28, 1929, Serial No. 343,482

39 Claims. (Cl. 90—21.5)

This invention is directed to transmission and control mechanism and more particularly to such mechanism for machine tools and similar use.

A purpose of the invention is to provide an improved transmission and an improved control therefor, and an improved combination of such transmission and control with a machine tool, more particularly a milling machine.

Other purposes relate to improvements in transmission and control mechanism for machine tools, including rate change means, and devices for visibly indicating the rate of a member driven therefrom.

Other purposes relate to transmission and control means operable to permit the rate of a member driven from a substantially constant-speed source, to be in part determined in accordance with the instantaneous operating conditions, such as the load resistance, and to the combination therewith of means visibly indicating the actual rate of the driven member.

Other purposes relate to transmission and control means capable of operation to permit the rate of a driven member to be at least in part determined by the instantaneous operating conditions, such as the load resistance, or to permit of operation in a manner to maintain a predetermined, substantially constant rate in spite of variations in operating conditions; and to means for alternatively selecting the one or the other of such modes of operation which is necessary or desired for different operating conditions.

Other purposes relate to improvements in a transmission which is in part fluid operated, and to an improved control thereof, particularly of the fluid operated portion.

Other purposes relate to improvements in a transmission having a fluid operated portion, and in control means for maintaining the rate of a member driven therefrom substantially constant in spite of variations in fluid leakage caused by variations in load resistance, or fluid temperature, or viscosity, etcetera.

Other purposes relate to improvements in a transmission having a fluid operated portion capable of adjustment for a change in rate of a driven member, and to control means for adjusting such portion, and to means for maintaining substantially constant the rate pre-selected by such adjustment, in spite of variations in fluid leakage caused by variations in load resistance or fluid temperature or viscosity, etc.

Other purposes are to generally simplify and improve the construction and operation of transmission and control mechanism, particularly for milling machines, and still other purposes will be apparent from this specification.

The invention consists of the construction and combination of parts as herein illustrated, described and claimed, and in such modification of the structure illustrated and described as may be equivalent to the claims.

In the drawings, the same reference characters indicate the same parts in each of the views, of which.

Figure 1:
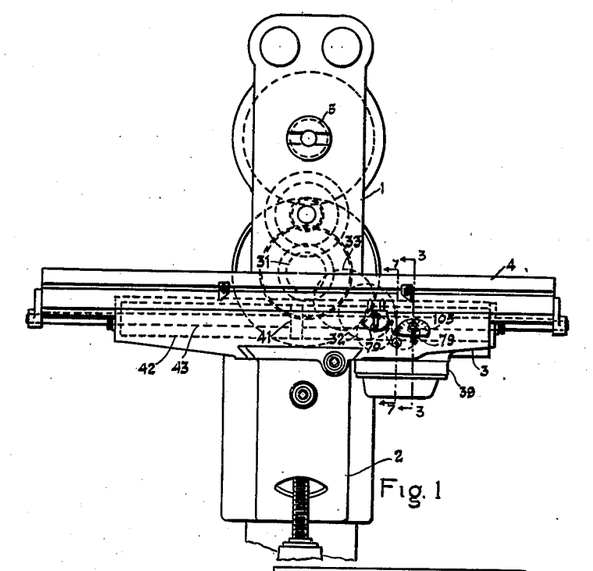
Fig. 1 is a front elevation of a portion of a milling machine incorporating the invention.

The milling machine includes a column or support 1, a knee or support 2 vertically slidably guided thereon, a saddle or support 3 guided on the knee for horizontal movement toward or from the column, and a table or work support 4 guided on the saddle for movement to right or left in Fig. 1.

A tool spindle or tool support 5 is rotatably journaled in column 1, and the structure described is such as to provide relative bodily movement between spindle 5 and table 4 in three mutually transverse paths.

A transmission is provided for spindle 5 as follows:

A pulley 6, adapted to be actuated from a suitable exterior power source, provides a power source for the milling machine. Pulley 6 is fixed on a sleeve 7 upon which is also fixed a member 8 of a clutch generally denoted by the numeral 9, Fig. 2. A shaft 10 has slidably keyed therewith a sleeve 11 upon which is fixed another clutch member 12, the members 8—12 having complementary friction faces at 13 which may be engaged or disengaged by movement of sleeve 11.

Sleeve 11 may be moved for such purposes by the means of a hand lever 14 fixed on a shaft 15 upon which is also fixed a lever 16 which moves a pivoted lever 17 by the means of a rod 18 having a pivoted engagement with the levers. Lever 17 provides a pivoted shoe 19 engaging an annular groove 20 in the sleeve 11.

Figure 2:
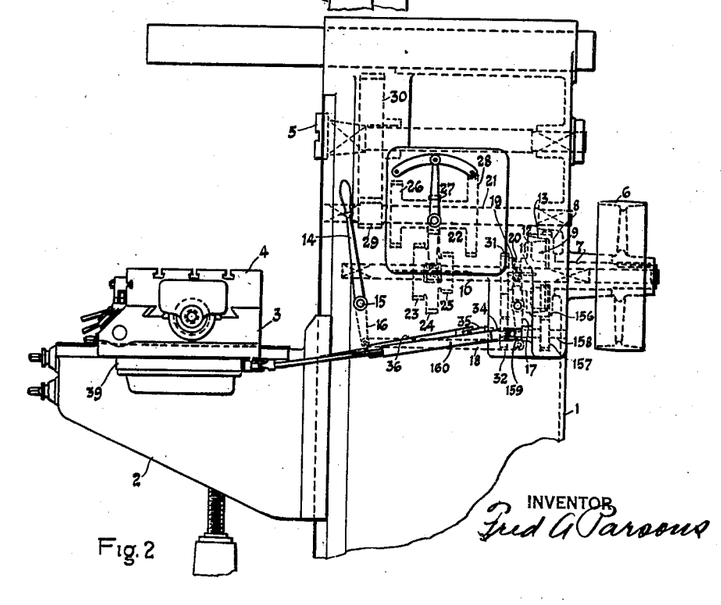
Fig. 2 shows a partial right hand side elevation of the same machine.

The shaft 10, which may be connected or disconnected from the power source by the mechanism described, drives a shaft 21 through a rate changer generally denoted by the numeral 22, Fig. 2, and consisting in this instance of different diametered gears 23—24—25 fixed together and slidably keyed with shaft 10 for movement to engage one at a time with complementary gears 26—27—28 fixed on the shaft 21. Shaft 21 drives spindle 5 through a pinion 29 fixed on the shaft and a gear 30 meshed with the pinion and fixed with the spindle.

A feed train for power movement of table 4 is driven from the spindle train at a point between the clutch 9 and the rate changer 22, as follows:

Fixed on sleeve 11 is a gear 31, Figs. 1-2, which drives a gear 32 through an idler 33. Gear 32 is fixed on a shaft 34 upon which is also fixed the driving member 35 of an extensible universal joint shaft of well known construction and generally denoted by the numeral 36, Fig. 1. The driven member 37 thereof, Figs. 4-8, is fixed on a shaft 38 journaled in a housing 39, Figs. 1-2-7, fixed on saddle 3, and driving a fluid pump generally denoted by the numeral 40, Figs. 4-6-7-8. A fluid motor for movement of table 4 from pump 40 consists in this instance of a piston 41, Figs. 1-8, operating in a cylinder 42 and having a piston rod 43 extending out of the cylinder at each end thereof and fixed at one or both ends with the table. The motor is operable from pump 40 through a reverser valve generally denoted by the numeral 44, Figs. 6-7-8.

Pump 40 may be of any suitable form, but as here shown is of a construction similar to that fully shown and described in a United States Patent No. 1,678,050, issued July 24, 1928, and will therefore be only briefly described.

Figures 6, 6A, 6B, 7:
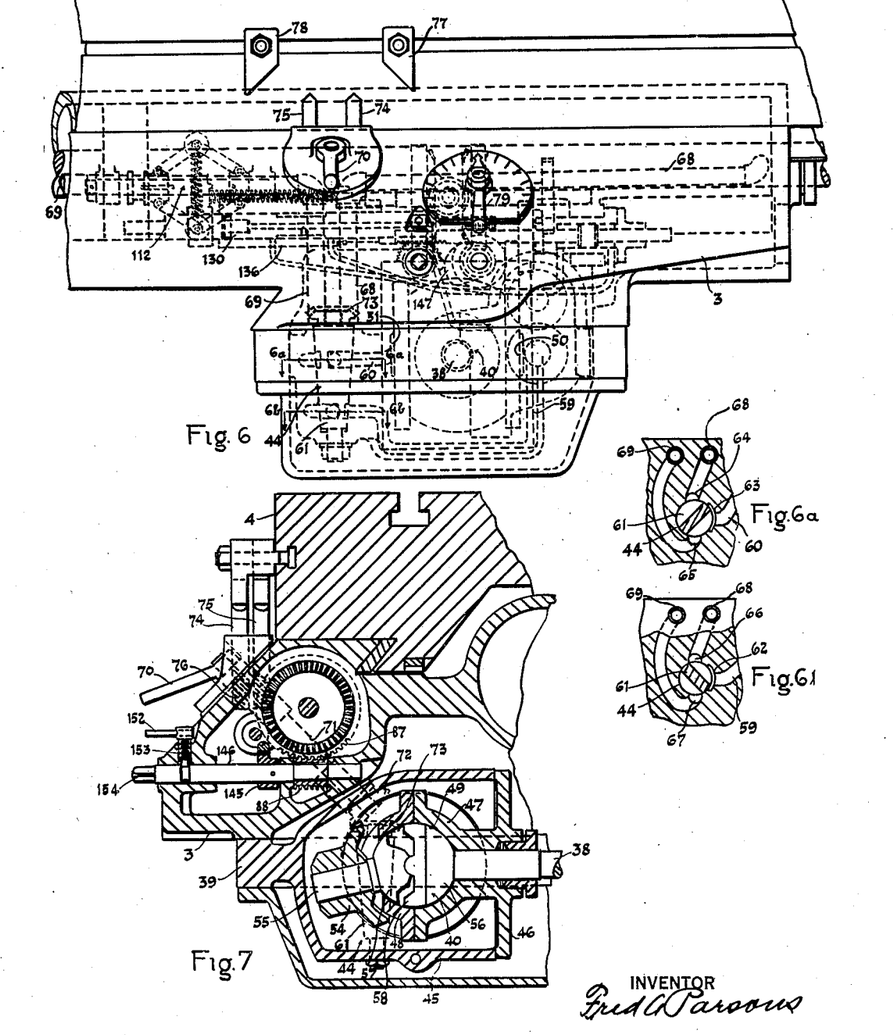
Fig. 6 is an enlarged portion of Fig. 1.
Figs. 6a—6b show sections through a reverser valve taken along line 6a—6a and 6b—6b of Fig. 6.
Fig. 7 shows a partial vertical section taken along line 7—7 of Fig. 1 and enlarged.
Figure 8:
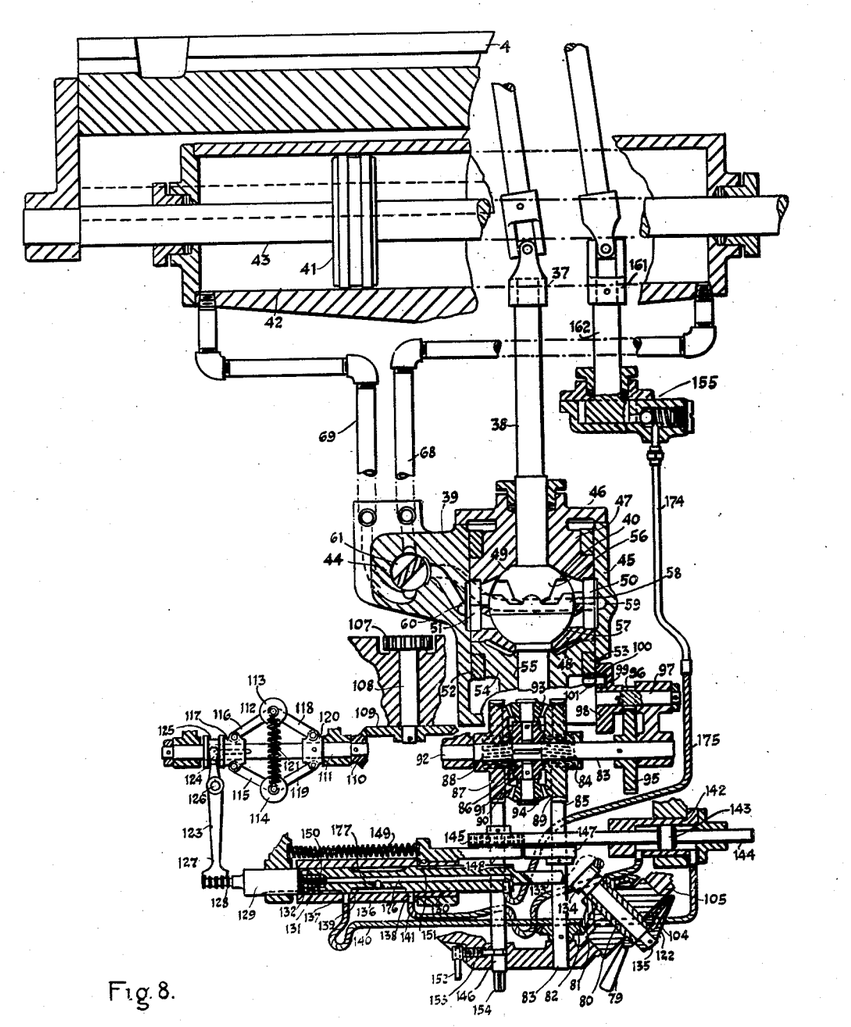
Fig. 8 is a diagrammatic view of certain of the transmission and control mechanism, arranged to show operating relationship rather than the relative position of the parts.

The pump is retained within a substantially closed casing 45, Figs. 7-8, fixed with housing 39 and having a removable cover portion 46 carrying a pump housing member 47. Removably fixed thereon is a pump housing member 48. Portions of the housing members form trunnions respectively on opposite sides of a spherical chamber 49 having its center coinciding with the axis of shaft 38. Ports 50—51, respectively for suction and exhaust, communicate with the chamber 49 through the trunnions. The trunnions mentioned support ring members 52—53 fixed with a member 54, whereby the rings and member form a unit supported and guided for movement about an axis passing through the center of the spherical chamber and at right angles to the axis of shaft 38. Journaled in member 54 is a shaft 55 having its axis at right angles to the axis about which member 54 moves, and passing through the center of the spherical chamber in any position of member 54. Fixed on shafts 38—55 respectively are members 56—57. An intermediate member 58 is pivoted both with member 56 and member 57, the respective pivots being at right angles to one another and each passing through the center of the spherical chamber.

Member 56, driven from shaft 38, drives the intermediate member 58, which in turn drives member 57 and shaft 55 and the arrangement is such that when member 54 is adjusted for shaft 55 to stand at an angle relative to shaft 38 there are formed within the spherical chamber four separate substantially closed chambers each of which is alternately expanded and contracted during each revolution of the parts, and each of which is positioned by such rotation to communicate during expansion with the suction or inlet port 50, and during contraction with the pressure or outlet port 51 whereby fluid is forced through the pump. The amount of volume change of the chambers during rotation and therefore the rate of fluid delivery from the pressure port is dependent upon the adjustment of member 54; being zero when the member is adjusted for shaft 55 to be in axial alignment with shaft 38, whereby the position of adjustment of the member and shaft will determine the rate at which the piston 41 is moved and the table rate may be changed while maintaining the drive shaft 38 at a constant speed.

The channels leading from pump 40 to the cylinder 42 are as follows: Referring to Figs. 6-6a-6b-8, the pump ports 50—51 respectively open into closed channels 59—60 which lead to ports adjacent the movable stem 61 of reverser valve 44. The channel 59 terminates in a port 62, Fig. 6b, and channel 60 terminates in a port 63, Fig. 6a. The ports 62—63 are respectively adjacent the opposite ends of the movable valve stem 61. Adjacent port 63 are ports 64—65 and adjacent port 62 are ports 66—67. The ports 64—66 each communicate with a pipe or channel 68 leading to the right end of the cylinder 42, Fig. 8, while the ports 65—67 each communicate with a channel or pipe 69 leading to the left end of the cylinder. The direction of rotation and all adjustments of pump 40 are such that fluid is expelled through pump port 51, and valve stem 61 is cut away as shown in Figs. 6a-6b to lead the fluid when the valve is in the position there shown, from pump port 51 through channel 60, and valve port 63, through the valve stem to the valve port 65 and through channel 69 to the left end of the cylinder to move piston 41 and table 4 to the right. At the same time the cut away valve portions connect the channels for the fluid from the right end of the cylinder in Fig. 8 to be expelled through channel 68, valve ports 66 and 62, channel 59 to the pump inlet port 50. If the valve stem 61 is turned one-quarter turn from the position shown in Figs. 6a-6b, the connection of the pump inlet and outlet ports with the cylinder will be reversed and the table will move the other direction. The ports 62—63 are made relatively large in order that an intermediate position of the valve stem will simultaneously open both ports 62—63 to both channels 68—69 in which case the ports 62—63 will communicate with one another thus by-passing pump 40 to stop the table. In such case the channels 68—69 are also freely connected, thus by-passing the fluid from one side of the piston to the other, whereby the table when not connected with its transmission may be moved by suitable manual means (not shown).

The valve stem 61 may be shifted to effect either direction of table travel or to bring the table to a stop by the means of a hand lever 70, Figs. 1-6-7, fixed on a shaft 71, upon which is also fixed a bevel gear 72, engaging a bevel gear 73 fixed on the valve stem. The valve stem may also be shifted to neutral or intermediate position at a predetermined position of table movement by the means of plungers 74—75 respectively on opposite sides of the shaft 71 and engaging suitable angular rack teeth on the plungers with gear teeth 76 on the shaft. The relation is such that movement of shaft 71 to engage either direction of table travel moves one of the plungers 74—75 upwardly, and in the course of the resulting travel the plunger may be contacted by the one or the other of dogs 77—78 adjustably fixed on table 4, the plungers and dogs having complementary angular surfaces adapted to move the plunger back down again to position valve stem 61 in a motion interrupting position.

Pump 40 may be adjusted manually to determine the rate of table travel by the means of the following mechanisms. A hand lever 79, Figs. 1–3–6–8, is fixed on a sleeve 80 rotatably fixed in saddle 3. Also fixed on sleeve 80 is a bevel gear 81 engaging a pinion 82 fixed on a shaft 83. Fixed on shaft 83 is a worm 84 engaging a worm wheel 85 which forms a member of a differential device generally denoted by the numeral 86, and which includes the worm wheel 85, another worm wheel 87, normally prevented from movement by its engagement with a worm 88, a plurality of bevel gears 89—90 fixed with the different worm wheels respectively, a frame or spider 91 fixed on a shaft 92 upon which the wheels 85—87 are rotatably supported, and bevel pinions 93—94 each rotatably carried by frame 91 and each engaging both bevel gears 89—90.

The arrangement is such that worm 84 may turn shaft 92 through the differential mechanism. Fixed on shaft 92 is a gear 95 engaging a pinion 96 fixed on a shaft 97 upon which is also fixed a cam 98 having a cam groove 99 within which is a follower roll 100 pivoted on a plunger or rod 101 having rack teeth 102 engaging suitable teeth 103 on the periphery of the pump ring 53. By the means of the described mechanism the pump members may be relatively adjusted to vary the volume of pump flow.

A pointer or indicator 104, Figs. 3–8, is movable relative to a chart or dial 105, Figs. 1–3–8, in accordance with the movement of lever 79, the pointer being in this case fixed with the lever. The chart or dial 105 is preferably graduated to indicate rates of table travel which result from a given position of the hand lever and pump when there is no load resistance to table movement.

The actual rate of table movement will, unless prevented, vary somewhat in accordance with such load resistance because of leakage in the pump and motor, and means are provided to indicate against the same chart or dial the actual instantaneous rate of the table.

Such means are as follows: Fixed with the table 4 is a rack 106, Fig. 3, engaging a pinion 107, Figs. 3–4–8, fixed on a shaft 108 upon which is also fixed a bevel gear 109 engaging a pinion 110 fixed on a shaft 111, whereby shaft 111 is rotated at a relatively high speed in exact accordance with the movement of table 4. A speed responsive device generally denoted by the numeral 112 is driven from shaft 111 and in this case consists of weights 113—114 pivoted with retaining arms 115—116 pivoted with a member 117 slidably keyed on shaft 111, and with retaining arms 118—119 pivoted with a member 120 fixed on shaft 111. Weights 113—114 are normally drawn toward one another by springs 121 whereby to press member 117 to the left in Figs. 4–8 but when the table 4 is moved the shaft 111 rotates and in either direction of such rotation centrifugal force acting on weights 113—114 causes the weights to separate, and member 117 to move to the right by an amount proportional to the speed or rate of table 4.

Member 117 is connected to move a pointer or indicator 122 reading against the dial 105 as follows: A lever 123, having a fork 124 engaging an annular groove 125 in member 117, is pivoted at 126 and an arm 127 engages suitable gear teeth thereon with circular rack teeth 128 on a slidably guided member 129, which is adjustably fixed with a slidably guided member 130 by the means of a threaded portion 131 and nut 132. Member 130 has a portion 133 extended for suitable rack teeth thereon to engage a pinion 134 fixed on a shaft 135 journaled in an axial bore of sleeve 80 and having the indicating pointer 122 fixed thereon.

The respective pointers 104—122 move in accordance with different mechanisms differently movable through the range of table movement corresponding to the dial graduations therefore the movement of one or both pointers must be corrected through at least a portion of the range of movement to suit the dial, since the dial cannot be graduated to correspond with the uncorrected movement of both mechanisms. In this case the dial 105 is graduated in accordance with the movement of speed responsive device 112 and pointer 122 and the mechanism connecting pointer 105 with pump 40 is provided with correcting mechanism consisting of the cam 98 previously described. Thus the pointers may each follow the same movement and by the means of the adjustment between the members 129 and 130 they may be relatively adjusted to corresponding positions.

The arrangement is such that when there is no load resistance to table movement the pointer 104 will indicate against dial 105 the table rate resulting from any position of pump 40 and pointer 122 will move to a corresponding position as soon as the table starts movement at that rate. But, unless prevented by mechanism later described the table movement will slow down because of fluid leakage as soon as there is a load resistance, and in exact accordance with such resistance. In such case the pointer 122 will move to a position corresponding to the instantaneous actual table rate, while pointer 104 remains in its previous position and the two pointers together conveniently indicate not only the actual table rate irrespective of the setting of pump 40, but also the difference between the actual rate and the rate at no table load, whereby the instantaneous load on the table may be accurately estimated from such difference.

Mechanism is provided which if desired may be used to maintain a table rate corresponding to any position of pointer 104, irrespective of the table load, as follows:

A sleeve or member 136, Figs. 4–6–8, is slidably fitted on the member 130, and is provided with two ports 137—138 respectively adapted to receive fluid from a channel or chamber 139 associated with member 130, as the member 130 is moved relative to member 136 in the one or the other direction. The ports 137—138 communicate through suitable channels such as flexible tubes 140—141 with opposite ends respectively of a cylinder 142 having a piston 143 and a piston rod 144 extended for suitable rack teeth thereon to engage with a gear 145 fixed on a shaft 146 upon which is also fixed the worm 88 meshing with the worm wheel 87 of the differential mechanism 86 previously described.

The member 136 is arranged to move in accordance with the movement of pointer 104, by the means of a cam 147, fixed on the shaft 83 and a cam follower plunger 148 fixed with member 136 and moved by the cam in the one direction and by a spring 149 in the other direction, whereby the position of member 136 at all times corresponds to the position of pointer 104. The cam 147 is configured for such position also to correspond with the position which would be assumed by the member 136 if the table were traveling at a rate corresponding with the setting of pointer 104. But if the table is not traveling at such a rate, as for instance, when the table load resistance causes leakage of fluid in the table transmission, then the position of the member 130 does not correspond and there is relative displacement between members 130—136 in a direction corresponding to the amount of increase or decrease of actual table rate from the rate indicated by pointer 104.

The arrangement is such that when both members 130—136 are positioned in accordance with the position of pointer 104 neither of the ports 137—138 receive fluid from chamber 139, but in the event that because of a variation of actual table rate from indicated table rate, the relative position of the members 130—136 is changed, the one or the other port will receive fluid according to the direction of such variation above or below the indicated rate. The fluid thus admitted to the ports shifts piston 143, the fluid from the idle side of the piston being relieved at the same time to permit the piston to move, through recesses or channels 150 or 151 arranged in the member 130 to be opened to the inactive port by the same movement which renders the other port active. The piston in turn adjusts pump 40 through the differential mechanism and pump shifting train connected therewith as previously described. The direction of adjustment of pump 40 from the one or the other port 137—138 is such as to increase or decrease the table rate, whichever may be necessary to cause member 130 to be moved to correspond to the position of member 136 and pointer 104, and such pump adjustment will continue as long as the members 130—136 are relatively displaced or in other words until the actual rate of table 4 corresponds to the rate indicated by pointer 104.

It will be noted that, although the main source of variations from desired table rate, when using a hydraulic table transmission, is due to changes resulting from changes in temperature of the fluid used, or leakage due to changes in pressure, yet the mechanism above described also acts to maintain the rate against variations from other causes or any cause, such as a slowing down of the main driving pulley for any reason.

In the operation of the machine it is sometimes preferable to permit the table rate to vary in accordance with load resistance and at other times preferable to maintain a predetermined constant rate. For this reason there is provided means whereby the rate maintaining mechanism just described may be selectively rendered operative or inoperative, as follows:

The shaft 146 is provided with locking means, consisting of a hand lever 152 fixed on a threaded stem 153 having an end portion adapted to engage and frictionally lock the shaft against movement, whereby the rate maintaining mechanism is ineffective to adjust pump 40. When the rate maintaining mechanism is inoperative, the worm wheel 87 of the differential mechanism 86 should occupy a predetermined position such that the adjustment of pump 40 produces the rate indicated by pointer 104 when there is no table resistance. Such position of worm wheel 87 may vary somewhat according to the temperature and viscosity of the fluid in the transmission but may be readily determined by first setting the pointer 104 to some position productive of table movement, then with no load resistance on table 4 adjusting the pump 40 by the means of a hand crank (not shown) applied to the squared end 154 of shaft 146, until the table rate as indicated by pointer 122 corresponds to the rate indicated by pointer 104. The shaft 146 may then be locked by lever 152 to retain the worm wheel 87 in the position thus found.

Fluid under pressure may be supplied to the chamber 139 from any suitable source for operation of the rate maintaining mechanism but in this case is supplied as follows:

A pump generally denoted by the numeral 155, Figs. 3-4-5-8 is driven from the spindle transmission at a point between the pulley 6 and clutch 9. The pump drive train consists of a gear 156, Fig. 2, fixed on clutch member 8 engaging a gear 157 fixed on a shaft 158 upon which is also fixed the driving member 159 of an extensible universal joint generally denoted by the numeral 160 and having a driven member 161 fixed on the drive shaft 162 of the pump.

Figures 3, 4, 5:
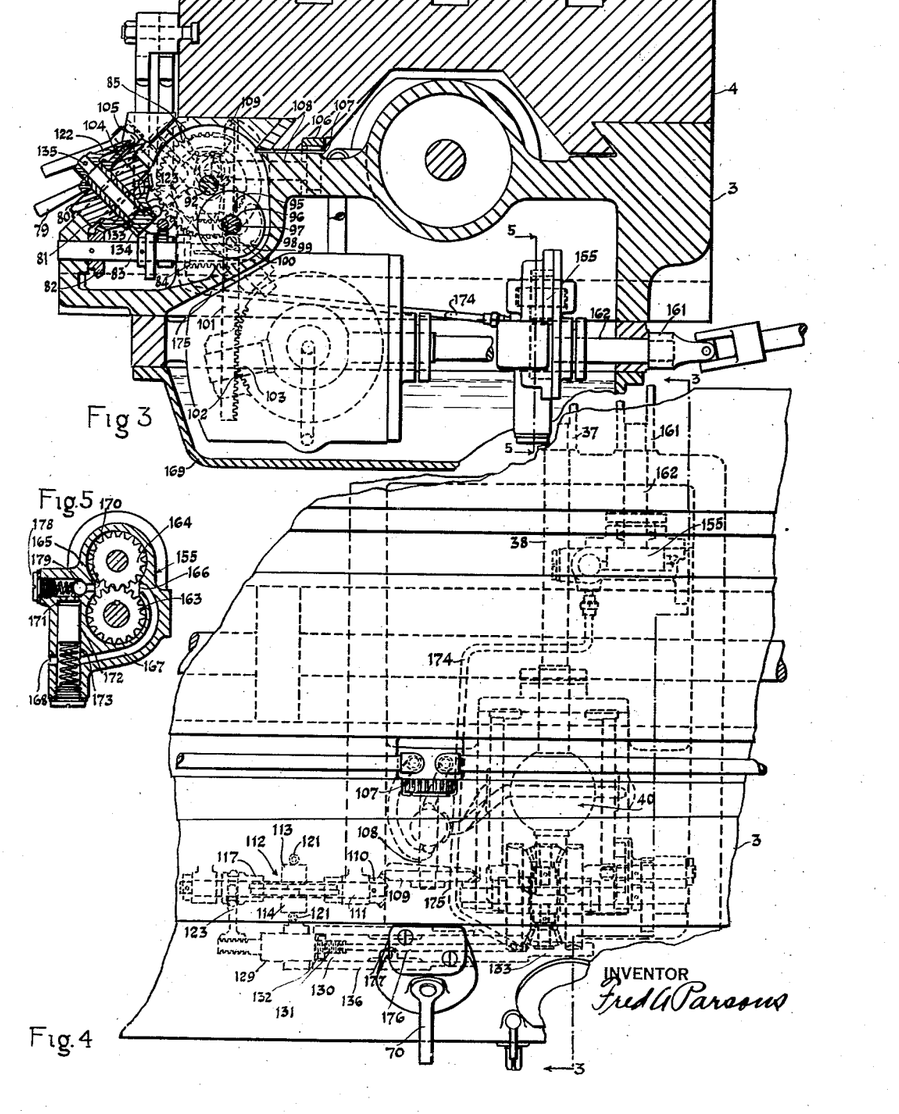
Fig. 3 is a partial vertical section taken along line 3—3 of Fig. 1 and enlarged.
Fig. 4 shows an enlarged plan view of a portion of the machine to the right in Fig. 1, omitting a work table positioned over the members shown.
Fig. 5 is a partial section taken along line 5—5 of Fig. 3.

Pump 155 may be of any suitable type but in this case is of well known form consisting of gears 163—164, Fig. 5, substantially enclosed within a casing or housing 165. The inlet port 166 communicates through a channel 167 with an inlet opening 168 submerged in fluid contained within a reservoir formed by a housing or cover 169, Fig. 3, arranged to receive back all fluid used in the operation of the rate maintaining mechanism.

The outlet or pressure port 170, Fig. 5, communicates with an accumulator consisting of a variable volume chamber 171 formed by a spring pressed plunger 172 movable in a bore 173. The chamber 171 supplies fluid to the chamber 139 through a pipe or channel 174, a flexible tube 175, a channel 176 within the member 130 and an opening 177. The channel 167 communicating with inlet port 166 passes through the bore 173 in a manner such that the movement of plunger 172 closes the inlet channel when the accumulator chamber 171 has received a predetermined volume of fluid, sufficient to operate the rate maintaining mechanism through an ordinary rate correcting movement, and to prevent the fluid pressure in chamber 171 from reacting on the pump when the channel 167 is thus closed there is provided a check valve 178 consisting of a spring pressed ball 179 in the channel between the pump outlet port 170 and chamber 171. The described arrangement is such that the pump 155, although continuously running, consumes power only in substantial accordance with that required for the operation of the rate maintaining mechanism, yet at all times there is instantly available sufficient fluid for the normal requirement of such operation.

It will be noted that the only purpose in providing a manual pump adjustment from lever 79 is to provide for operation of the machine without the operation of the power shifter which maintains a constant table rate. In the event that this alternative operation is not necessary, that is to say, if it is satisfactory to at all times control the table to maintain a constant predetermined rate irrespective of leakage or other factors tending to cause rate variation, then the control mechanism may be simplified by eliminating the connection from shaft 83 to the pump adjusting means.

What is claimed is:

1. In a machine tool the combination of a work support, a tool support, a power source, a transmission connecting said power source for movement of one of said supports and including rate change means adapted to vary the rate of said movement, and means visibly indicating the rate of movement of the last mentioned support, said means including a device having members relatively movable independently of said rate change means and in accordance with variations in the rate of said last mentioned support and speed indicating elements connected for relative movement from said device.

2. In a machine tool the combination of a work support, a tool support, a transmission for movement of one of said supports, and means visibly indicating the rate of movement of the last mentioned support, said means including a device having members actuated for relative movement in accordance with the actual rate of movement of the last mentioned support, and speed indicating elements connected for relative movement from said device.

3. In a machine tool the combination of a work support, a tool support, a transmission for movement of one of said supports including an adjustable rate changer, movable adjusting means therefor, means visibly indicating the position of said adjusting means, and means visibly indicating the actual rate of movement of the last mentioned support irrespective of the position of rate changer adjustment.

4. In a machine tool the combination of a movable member, a transmission for actuating said member including a fluid operable portion and an element driven therethrough, and means for visibly indicating the actual rate of movement of said member, said means including a device having a plurality of members actuated for relative movement from said element, and speed indicating elements actuated for relative movement from said device, whereby changes in rate of said member caused by changes in operating conditions of said machine tool may be visibly indicated as they occur.

5. In a machine tool the combination of a movable member, a transmission therefor including a fluid operable rate changer adjustable for the purpose of changing the rate of member movement and an element driven through said rate changer, movable adjusting means for said rate changer, means visibly indicating the position of said adjusting means, and means visibly indicating the actual rate of said member, the last mentioned means including a device having a plurality of members actuated for relative movement from said element, and speed indicating elements actuated for relative movement from said device.

6. In a machine tool the combination of a movable member, a transmission therefor including adjustable rate change means, a first indicating device movable in accordance with the position of adjustment of said rate change means, a second indicating device movable in accordance with the actual rate of said member, and a speed indicating charge common to both said devices, whereby differences in the position of said devices visibly indicates against said chart the amount of variation of the actual rate of said member from the rate normally corresponding to the adjustment of said rate change means.

7. In a machine tool the combination of a movable member, a transmission therefor including an adjustable rate change means, a first movable rate indicating device, a train connecting said device with said rate change means for movement in accordance with the adjustment thereof, a second movable rate indicating device, a train connecting said second device for movement in accordance with the actual rate of movement of said member, said trains including means establishing a rate indicating range of movement of one device to substantially correspond with the range of movement indicating corresponding rates in the other device.

8. In a machine tool the combination of a movable member, a transmission therefor including adjustable rate change means, and means automatically operative in accordance with changes in the rate of said member to adjust said rate change means to maintain the rate of said member substantially at a predetermined value.

9. In a machine tool the combination of a movable member, a transmission therefor including a hydraulic portion and an element driven therethrough, said hydraulic portion being in part adjustable to change the rate of movement of said member, and means automatically operative in accordance with changes in the rate of said element to adjust said adjustable part to maintain the rate of said member substantially at a predetermined value.

10. In a machine tool, the combination of a movable member, a transmission therefor including an adjustable rate changer and an element driven therethrough, means automatically operable in accordance with the rate of said element to adjust said rate changer, whereby to maintain the rate of said member substantially at a predetermined value, and means alternatively adjustable for said automatically operable means to be operative or inoperative.

11. In a machine tool the combination of a movable member, a transmission therefor including a hydraulic portion and an element driven therethrough, said hydraulic portion being in part adjustable to change the rate of movement of said member, means automatically operable in accordance with changes in the rate of said element to adjust said adjustable part, whereby to substantially maintain a desired rate of said member, and means alternatively adjustable for said automatically operable means to be operative or inoperative.

12. In a machine tool, the combination of a movable member, a transmission therefore including an adjustable rate changer, manual means for adjusting said rate changer, means for adjusting said rate changer in accordance with the rate of said member, and means operative on said rate changer for the adjustment thereof from each of said adjusting means to select and maintain a desired rate in spite of variations in operating conditions.

13. In a machine tool the combination of a movable member, a transmission therefor including an adjustable rate changer, manual means for adjusting said rate changer, means for adjusting said rate changer in accordance with the rate of said member, means operative on said rate changer for the adjustment thereof from each of said adjusting means, and means for selectively rendering said movable means operative or inoperative while maintaining the operation of said manual means.

14. In a machine tool the combination of a movable member, a transmission therefor including an adjustable rate changer, manual means connected for adjusting said rate changer, means movable in accordance with changes in some of the operating conditions of said machine tool for adjusting said rate changer, a device visibly indicating the effect of said manual adjusting means, and a device visibly indicating the combined result of both said adjusting means.

15. In a milling machine the combination of a rotatable tool spindle, a work support movable relative thereto in a path transverse to the spindle axis, a transmission for said spindle, a train driven from said spindle transmission for movement of said work support and including a fluid operable portion in part adjustable for changing the rate of movement of said work support and also including an element driven through said fluid operable portion, and means automatically operative in accordance with changes in the rate of said element to adjust said portion.

16. In a machine tool the combination of a movable member, a transmission therefor including a fluid operable portion in part adjustable for changing the rate of member movement and an element driven through said portion, said portion being subject to leakage variations substantially in accordance with the resistance to member movement, manual means adjustable for a desired rate of said member, and means automatically operative in accordance with changes in the rate of said element to adjust said portion for substantially maintaining said desired rate in spite of said leakage variations.

17. In a milling machine the combination of a rotatable tool spindle, a work support movable relative thereto in a path transverse to the spindle axis, a transmission for said spindle, a power train for driving said support from said transmission and including a fluid operable portion in part adjustable for changing the rate of support movement and an element driven through said portion, manual means adjustable for a desired rate of support movement, and means automatically operative in accordance with changes in the rate of said element to adjust said portion to substantially maintain said desired rate.

18. In a milling machine, the combination of a rotatable tool spindle, a transmission therefor including a rate changer, a work support movable adjacent said spindle in a path transverse to the spindle axis, a power train for movement of said work support, said train being connected with said transmission to exclude said rate changer and including a fluid operable portion and an element driven therethrough, said fluid operable portion being adjustable to vary the rate of support movement, and a speed responsive device for visibly indicating the rate of said support and connected for operation from said power train through said element.

19. In a milling machine the combination of a rotatable tool spindle, a work support movable relative thereto in a path transverse to the axis of said spindle, a power source, a transmission including a rate changer and driven from said power source to actuate said spindle, a power train driven from said source to actuate said support exclusive of said rate changer and including a fluid operable rate changer and a reverser, whereby the support may be actuated at a variety of rates determined by said fluid operable rate changer and in either direction of said path, and a speed responsive rate indicator adapted to indicate the rate of movement of said support and connected to be actuated from said power train through said fluid operable rate changer and said reverser.

20. In a machine tool the combination of a movable support, a transmission for movement therefor including a fluid operable portion in part adjustable for changing the rate of support movement, a first means shiftable for adjusting said portion to a position approximately productive of a desired rate of support movement, other means shiftable independently of said first means for additionally adjusting said portion, and means for shifting said other means in accordance with changes in the rate of movement of said support.

21. In a machine tool the combination of a movable support, a transmission for movement thereof including a fluid operable portion in part adjustable for changing the rate of support movement, a manual means for adjusting said portion to a position approximately productive of a desired rate of support movement, power means for additionally adjusting said portion, and control means for said power means and in part operative in accordance with the position of said manual means and in part operative in accordance with changes in the rate of movement of said support.

22. In a machine tool having a movable support the combination of a transmission for movement thereof including a fluid operable portion in part adjustable for changing the rate of support movement, a power operated shifter for adjustment of said portion, and a control device for said shifter including a member manually shiftable to a variety of positions, and a member shiftable in accordance with changes in the rate of movement of said support, said device being operative in accordance with the relative position of said members.

23. In a machine tool the combination of a movable support, a transmission for movement thereof including a portion adjustable to change the rate of support movement and reversing means in serial arrangement with said adjustable portion, a power operated shifter for adjustment of said portion independently of the effect of said reversing means, and speed responsive means automatically controlling said power operated shifter in accordance with changes in the rate of movement of said element.

24. In a machine tool the combination of a movable support, a transmission for movement thereof including a fluid operable portion oppositely adjustable to increase or decrease the rate of support movement, a shifter including a device having opposite power movements respectively to adjust said portion in directions to increase and decrease the rate of support movement, means movable in the one or the other direction accordingly as the rate of support movement is lesser or greater than a predetermined rate, and a connection from said means for shifting said device.

25. In a machine tool the combination of a movable support, a transmission for movement thereof including a fluid operable portion in part adjustable to change the rate of support movement, a manually adjustable rate change device, a power operable shifter for adjustment of said portion, an element movable in accordance with the adjustment of said device, an element movable in accordance with the actual rate of support movement, and control means for said power operable shifter and operable in accordance with the relative position of said elements.

26. In a machine tool, the combination of a movable support, a transmission therefor including a fluid operable portion in part adjustable for changing the rate of support movement, manual means for adjustment of said portion, power operable means for adjustment of said portion, a power source for said power operable means, a control device operable to determine the connection of said power source with said power operable means in accordance with the changes in the rate of movement of said support whereby to maintain a predetermined rate of support movement, and means selectively adjustable to render said power operable means effective or ineffective.

27. In a machine tool, the combination of a movable member, a transmission therefor including adjustable rate change means and reversing means in serial relation and means automatically operative to adjust said rate change means, said means including a device operable in accordance with a change in some of the operating conditions of said machine tool, and a motion transmitting connection from said device to said rate change means adapted to maintain the rate of said member substantially at a predetermined value in spite of said variations in operating conditions, said connection being operative independently of the effect of said reversing means.

28. In a machine tool, the combination of a movable member, a transmission for actuating said member including reversing means, a fluid operable motor, a pump, a fluid circulating system including a channel between said pump and motor containing fluid under pressure and adjustable rate change means, power operable means for adjustment of said rate change means, control means for said power operable means including relatively movable elements, and means for relative movement of said elements and operable in accordance with changes in some of the operating conditions of said machine tool, said means for element movement being operable for said movement independently of the effect of said reversing means.

29. In a machine tool, the combination of a movable member, a transmission therefor including a hydraulically operable portion adjustable for changing the rate of member movement, a manually operable means for adjusting said portion for a desired rate, and automatic means for adjusting said portion said automatic means including a device operable in accordance with a change in some of the operating conditions of said machine tool, and a motion transmitting connection adapted to adjust said portion to maintain said rate in spite of said change in operating conditions.

30. In a machine tool, the combination of a movable member, a transmission therefor including a hydraulically operable portion adjustable for changing the rate of member movement, a device having a plurality of elements each independently movable for the adjustment of said portion, manual means for the movement of one of said elements to adjust said portion to effect a desired rate of member movement, and means automatically operative through the other of said elements in accordance with a change in some of the operating conditions of said machine tool, whereby to adjust said portion to maintain said rate in spite of said change in operating conditions.

31. In a machine tool, the combination of a movable member, a transmission therefor including adjustable rate change means, manual means for adjusting said rate change means to approximately predetermine a desired rate, other means movable in one or the other direction in accordance with changes in some of the operating conditions of said machine tool, and means connecting said other means for further adjustment of said rate change means to maintain said desired rate in spite of said variations in the operating conditions of said machine tool.

32. In a machine tool, the combination of a movable member, a transmission therefor including adjustable rate change means, manual means for adjusting said rate change means to approximately predetermine a desired rate, other means for further adjusting said rate change means in accordance with changes in some of the operating conditions of said machine tool, and control means alternatively adjustable for selectively preventing or permitting the adjustment of said rate change means from said other means.

33. In a machine tool, the combination of a movable member, a transmission therefor including a hydraulic motor and a fluid pump connected for operation of said motor, said pump being adjustable to various positions for a variety of rates of said member, manual means for adjusting said pump to approximately determine a desired rate of said member, means movable in one or the other direction in accordance with changes in the rate effect of said pump and means connecting said movable means for further adjustment of said pump to maintain a selected member rate substantially constant in spite of variations in some of the operating conditions of said machine tool.

34. In a machine tool, the combination of a movable member, a transmission therefor including a hydraulic motor and an adjustable pump connected for operation of said motor, manual means for adjusting said pump, other means for further adjusting said pump in accordance with variations in some of the operating conditions of said machine tool, and means alternatively adjustable for selectively preventing or permitting the adjustment of said pump from said other means.

35. In a machine tool, the combination of a movable member, a transmission for movement thereof including a fluid operable portion in part adjustable to change the rate of support movement, a manual means movable for adjustment of said portion to select a desired rate of support movement, and other control means continuously operative in accordance with variations in some of the operating conditions of said machine tool, said other control means being operative to adjust said portion to maintain a desired rate of support movement in spite of said variations.

36. In a machine tool, the combination of a movable member, a transmission for movement thereof including a fluid operable portion adjustable to change the rate of support movement, a manually operable means for adjustment of said portion for a desired rate of support movement, and control means operative in accordance with variations in some of the operating conditions of said machine tool, said control means having motion transmitting connection with said portion adapted to maintain said desired rate in spite of said variations.

37. In a milling machine, the combination of a rotatable tool spindle, a support movable in a path transverse to the spindle axis, a spindle transmission including a power source, and a rate changer, a support transmission having a hydraulically operable portion and driven from said spindle transmission exclusive of said rate changer, said hydraulically operable portion being in part adjustable for changing the rate of support movement, manually operable means for adjusting said portion for a desired rate, control means operative in accordance with variations in some of the operating conditions of said milling machine, and means operative from said control means to further adjust said portion to maintain a selected support rate substantially constant in spite of said variations in operating conditions.

38. In a milling machine, the combination of a rotatable tool spindle, a support movable in a path transverse to the spindle axis, a spindle transmission including a power source and a rate changer, a support transmission having a hydraulically operable portion and driven from said spindle transmission to exclude said rate changer, said hydraulically operable portion being adjustable for changing the rate of support movement, a device having a plurality of elements each independently movable for effecting a rate change adjustment of said hydraulically operable portion, a hand lever operable for said adjustment through one of said elements, means visibly indicating various support rates resulting from various positions of said lever when said milling machine is operated under certain operating conditions, and control means operable in accordance with changes in some of said operating conditions and operative through the other of said elements to effect another rate change adjustment of said hydraulically operable portion, whereby to substantially maintain the support rate indicated by said indicating means in spite of said changes in some of said operating conditions.

39. In a machine tool, the combination of a movable member, a transmission therefor including a hydraulic portion adjustable for changing the rate of member movement, and a plurality of means simultaneously available for rate change adjustment of said hydraulic portion, one of said means including a manually movable element and a chart movable relative thereto for indicating various rates of member movement, and the other of said means including a device operable in accordance with changes in some of the operating conditions of said machine tool, the last mentioned means being connected for rate change adjustment in a manner adapted to substantially maintain the rate indicated by the position of said element relative to said chart and in various of the relative element and chart positions irrespective of said variations in the operating conditions of said machine tool.

FRED A. PARSONS.